Patented Nov. 5, 1929

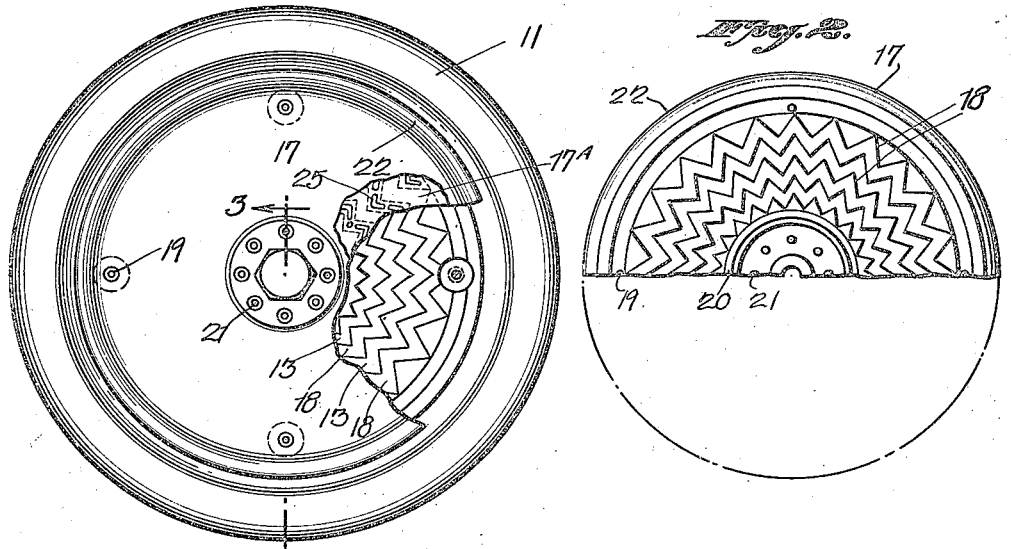
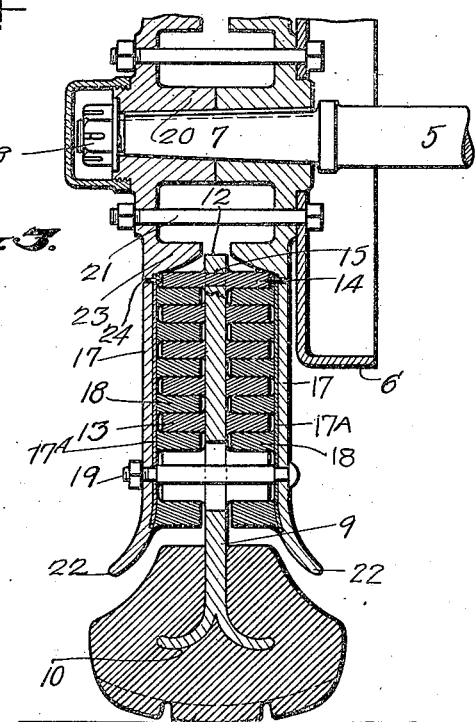

1,734,280

UNITED STATES PATENT OFFICE

ROBERT VOGEL, OF NEW YORK, N. Y.

VEHICLE WHEEL AND TIRE

Application filed September 21, 1928. Serial No. 307,475.

This invention relates to vehicle tires and wheels upon which the same are mounted, the invention being particularly directed to a wheel construction which is resilient, which will have the same qualities as a pneumatic tire and which will do away with the objections, such as puncturing and the like, which are attendant upon the use of pneumatic tires.

A particular object of the invention is to provide a wheel construction in which a central disk is employed having rubber fins which inter-engage with suitable rubber fins on a joining plate, the whole combination acting to support a vehicle and at the same time being resilient enough to take up the jars and shocks without transmitting the same to the body of the vehicle.

A still further object of the invention is to provide a wheel construction and ground engaging tire portion used therewith, the parts of which may be readily replaced when worn and which will be puncture-proof, thus eliminating blow-outs and the necessity of patching tubes and other parts common in pneumatic tires.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in side elevation of a wheel constructed in accordance with my invention, a part being broken away to show a portion of the rubber fins on the center plate.

Figure 2 is a view of the inside of one of the side plates, both of which are identical in construction, the view illustrating the position of the rubber fins for projection which are arranged to intermesh with the rubber projections of the center plate.

Figure 3 is a section taken on the line 3—3 of Figure 1 and illustrates how the rubber fins on the side and center plates intermesh to provide the resiliency necessary in overcoming road shocks and jars.

Referring to the drawings in detail, 5 indicates the axle, preferably of a motor vehicle to which is secured in the well known manner, the brake housing 6, the extended portion of the shaft 7 being arranged to hold the side plates of my improved wheel, the same being locked thereon through the medium of the usual locking nut 8 which jams the parts in position to maintain them securely about the axle 7.

My improved wheel consists of a central plate or disk member 9 having an outer forked end 10 about which is moulded the vulcanized rubber tire 11. This tire on its outer periphery may bear any tread design necessary in order to improve the traction qualities thereof. The center disk plate 9 is provided with a central opening 12 to permit the parts of the center of the wheel to pass therethrough. This plate 9 has vulcanized on the opposite faces thereof, the rubber fins or extensions 13, these fins being arranged in concentric circles and being moulded in zig zag fashion, as at 14. These concentrically located fins 13 at the opposite sides of the plate or disk 9, are integral by reason of the fact that during the moulding thereof upon the disk, the rubber that is vulcanized and moulded flows through suitable openings 15 in the plate 9, thus connecting the fins at opposite sides of the plate directly through the plate so that they will be securely held in position at suitable spaced points throughout their circumference, the number of openings 15 in the plate 9 being sufficient to effectively hold the concentric rings of fins in position. These fins 13 extending from the opposite sides of the center plate or disk 9 are arranged to inter-engage or rather, inter-lock with similar fins of vulcanized rubber carried on the inside of the side plates 17. Both of these side plates are identical, one being arranged to cover the inside of the wheel and the other, the outside. Each of these plates has secured thereto by the screws 24 and the shouldered ends of bolts 19 the fin disks 17—A carrying fins arranged in concentric circles and moulded directly thereon and held in the mould openings 25 provided for that purpose.

These fins 18 are also arranged in zig zag fashion and are spaced apart sufficiently to fit within and between the concentric fins 14 that are carried on the center plate 9. If desired, the outer edges of the plates 17 may be secured together through the use of suitable bolts 19 the holes of which are illustrated in the side plates 17. The side plates 17 are provided with hub portions 20 and are secured in place about the axle 7 through the medium of the bolts 21 which are secured in the brake housing 6.

In repairing or inspecting the inside of the wheel, it is quite evident that it is simply necessary to remove the nuts of the bolts 19 and 21 and remove the plates 17, thus exposing the rubber fins illustrated in Figure 2 which are moulded on the center plate 9.

It is quite evident that my improved wheel and tire may be employed upon any vehicle without the necessity of changing any of the parts. It is also quite evident that the hub portions 20 of the plates 17 meeting as they do about the axle 7, maintain a space between the inner edges of the fins 18 and the center plate 9 and also between the outer edges of the fins 14 of the center plate and the side plates 17, the purpose of these spaces being to provide for the expansion of the rubber fins in the take-up of any jar or jolt caused by road unevenness.

The outer peripheral edges of the plates 17, if desired, may be bent outwardly as at 22 so that they will form a stop for the tire 11 when the same moves up therebetween.

It is also evident that the frictional resistance of the fins of rubber to each other will provide an easy riding quality to the tire similar to that now obtained by the use of air. It is also evident that some means must be provided interiorly of the plates 17 for preventing movement of the inner circles of fins 14 bodily toward the axle and to this end, I have provided the rings 23 made of suitable metal and secured in any manner to the inside faces of the plates 17, thus a resistance is offered to the movement of the fins 14 inwardly while the space left between the bolts 21 and the inner circumference of the plate 9 is sufficient to permit movement of said plate 9 against the action of the fins to take up the jars and unevenness of the road.

It is evident that replacement of the worn rubber fins 18 may be accomplished by removal of said fin disks 17—A.

It is quite evident, therefore, that I have provided a puncture-proof, easy riding wheel and tire for use especially with automotive vehicles and one which may be readily placed in position, may be taken apart with a minimum of effort and time and which will greatly outlast any pneumatic tire.

It is evident also that I have provided a wheel and tire construction which has few parts, which may be manufactured at small cost and which will effectively stand up under the rough usage accorded in a vehicle tire and wheel.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. A vehicle wheel comprising spaced disks, means for mounting some of the disks on an axle, inter-engaging rubber extensions on the disks and a ground engaging tire on the periphery of one of the disks.

2. A vehicle wheel comprising spaced inner and outer disks, concentrically arranged rubber fins on said disks, a ring on each disk adjacent the inner fins, a central disk, rubber fins carried on the opposite faces of said disk and arranged to interengage with the inner and outer disk fins whereby a resilient connection is provided between the disks and a ground engaging tire on the periphery of said central disk.

3. A vehicle wheel comprising spaced inner and outer disks, concentrically arranged rubber extensions on said disks, a ring on each disk adjacent the inner extensions, a central disk, rubber extensions carried on the opposite faces of said disk and arranged to interengage with the inner and outer disk extensions whereby a resilient connection is provided between the disks, a ground engaging tire on the periphery of said central disk, axle engaging sleeves on said inner and outer disks and means for detachably holding said disks in fixed relation.

In testimony whereof I affix my signature.

ROBERT VOGEL. [L. S.]